Sept. 24, 1968     D. D. RHOADS ET AL     3,402,923
DEVICE FOR INACTIVATING A SELECTED PORTION
OF A COIL SPRING Filed Feb. 3, 1967                                2 Sheets-Sheet 1

INVENTORS.
Delmar D. Rhoads &
Robert H. MacKay

*Jeffers and Young*
ATTORNEYS

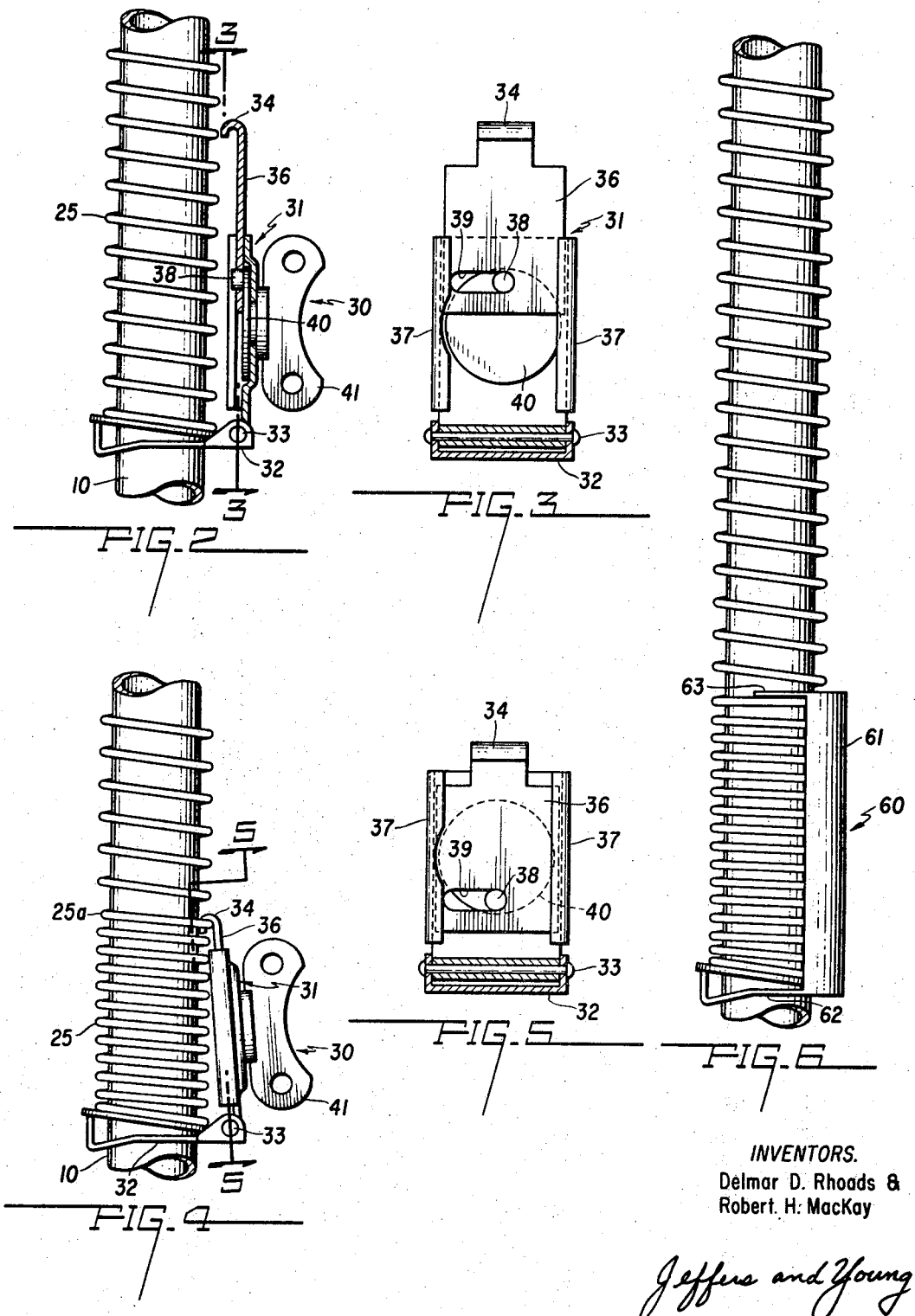

United States Patent Office 3,402,923
Patented Sept. 24, 1968

3,402,923
DEVICE FOR INACTIVATING A SELECTED PORTION OF A COIL SPRING
Delmar D. Rhoads and Robert H. MacKay, Fort Wayne, Ind., assignors to Lincoln Manufacturing Company, Inc., Fort Wayne, Ind., a corporation of Indiana
Filed Feb. 3, 1967, Ser. No. 613,908
5 Claims. (Cl. 267—61)

ABSTRACT OF THE DISCLOSURE

Helical springs are wound on elongated members to provide a structure that can support a load. In order that the spring deflection may be varied for different loads, a selected number of turns of each spring are inactivated by a clamp to leave the desired number of active turns for each spring.

Background of the invention

Our invention relates to a coil spring adjustment device, and particularly to a helical coil spring adjustment device that permits the number of inactive turns of a coil spring to be easily changed or adjusted.

Coil springs are used in many applications for resiliently supporting a load. In many applications, the springs are made relatively long so that the amount of spring deflection varies linearly with the applied load. These long coil springs may be wound about and supported on an elongated member. Usually, the elongated member is cylindrical in shape. A plurality of such springs and elongated members, usually three, are frequently used to support a platform on which plates, dishes, or other food equipment are placed. Previously, the springs have been designed and built for a particular weight or load. So, for a stack of dishes or food equipment of a particular kind, the uppermost dish or piece of equipment is at a predetermined or desired vertical location. As each dish or piece of equipment is removed, the load on the platform and springs is decreased, so that the resiliency of the springs moves the platform and remaining dishes or equipment upward an amount linearly proportional to the weight removed. Thus, the uppermost dish or piece of equipment is at the same vertical location. Such an arrangement works well where the springs are designed for the dishes or equipment being used. However, sometimes a different weight or type of dish or equipment may be used on the platform, so that the springs do not maintain the top or uppermost dish or piece of equipment at the desired vertical height. If the dishes or equipment are too light for the design of the supporting springs, the uppermost dish will be too high; conversely, if the dishes or equipment are too heavy for the spring design, the uppermost dish will be too low.

Accordingly, an object of our invention is to provide a new and improved device for adjusting supporting coil springs.

Another object of our invention is to provide an adjustment device that permits the number of inactive turns of a coil spring to be readily and easily changed or varied.

Another object of our invention is to provide a coil spring adjustment device for use on dish dispensing or dish supporting apparatus, this coil spring adjustment device permitting the number of inactive turns of each coil spring to be readily and easily increased or decreased so that the uppermost dish or piece of equipment of a stack is maintained at the desired vertical height.

Summary of the invention

Briefly, these and other objects are achieved in accordance with our invention by a device having an elongated central member. The central member has means at one end for securing the central member at a fixed location, such as to the elongated member about which the coil spring is wound. The central member also has means at the other end for engaging a selected turn of the coil spring. This device inactivates the turns of the coil spring located between the selected, engaged turn and the end of the spring near the fixed location of the central member. The number of turns inactivated determines the deflection of the spring for a given load. If more turns are inactivated (thus leaving less active turns), the spring will deflect less for a given load. If less turns are inactivated (thus leaving more active turns), the spring will deflect more for a given load. In one embodiment of our invention, the engaging means may be moved toward the secured one end of the central member to compress the inactivated turns of the coil spring. In another embodiment of our invention, the engaging means is arranged so that turns of the coil spring may be rotated and moved in either direction past the engaging means by a threading action. Both embodiments permit the number of inactive turns (and hence, the number of active turns) of a coil spring to be varied so as to vary the deflection of the spring for a given load.

Brief description of the drawing

The subject matter which we regard as our invention is particularly pointed out and distinctly claimed in the claims. The structure and operation of our invention, together with further objects and advantages may be better understood from the following description given in connection with the accompanying drawing, in which:

FIGURES 2 and 3 show views of one embodiment of our spring adjustment device in the open or inoperative position;

FIGURES 4 and 5 show views of the same one embodiment of our spring adjustment device in the closed or operative position; and FIGURE 6 shows a view of another embodiment of our spring adjustment device.

Description of the preferred embodiment

Figure 1:
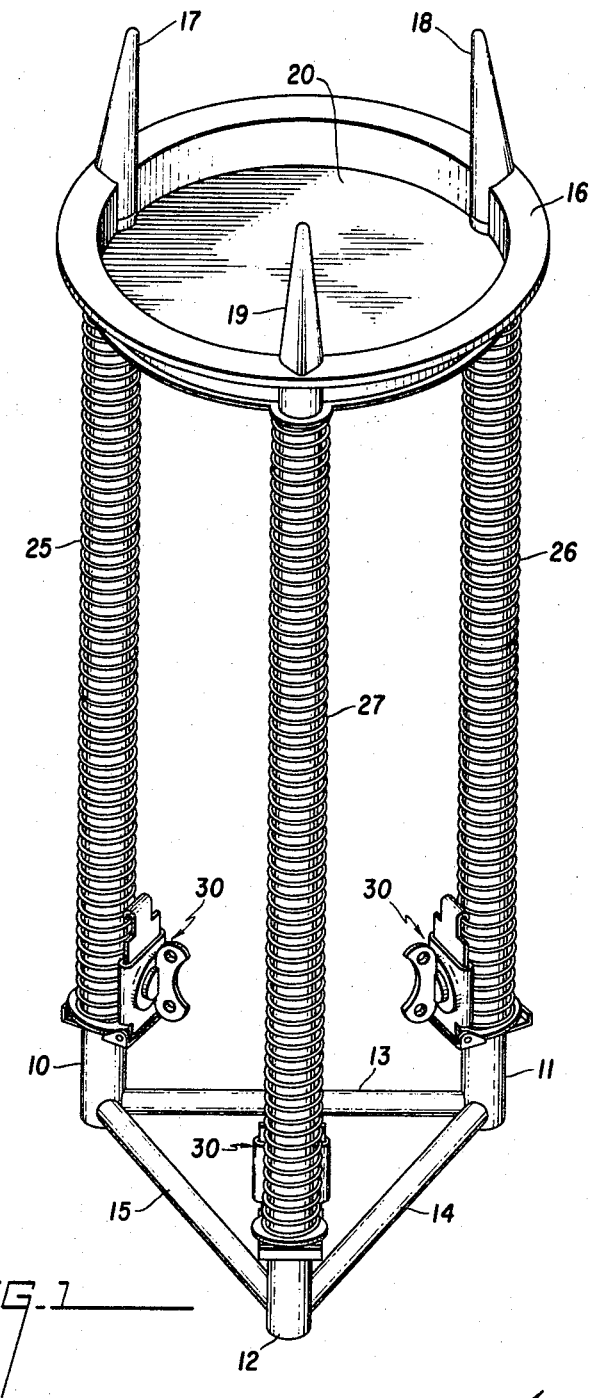
FIGURE 1 shows a perspective view of a spring supported dish elevator utilizing our invention.

FIGURE 1 shows a spring supported platform device, sometimes referred to as a dish elevator, utilizing one embodiment of a spring adjustment device in accordance with our invention. The dish elevator comprises three elongated members 10, 11, 12 which are preferably cylindrical in shape. These members 10, 11, 12 are suitably fastened together in a triangular configuration at their bottom by bottom members 13, 14, 15. The elongated members 10, 11, 12 are fastened together at the top in the triangular configuration by a circular flange or rim 16. Guide members 17, 18, 19 may be positioned at the top of the elongated members 10, 11, 12 to guide or indicate the placement of dishes or other food equipment to be placed on the dish elevator. A platform 20, preferably circular, is positioned within the triangular configuration of the members 10, 11, 12. The platform 20 is supported from beneath by helical or coil springs 25, 26, 27 which are respectively wound or positioned about the elongated members 10, 11, 12. The elongated members 10, 11, 12 are preferred or desired to support the springs 25, 26, 27. The springs are relatively long compared to their diameter so that they deflect linearly with applied load. Dishes or equipment placed on the platform 20 compress or push or deflect the springs 25, 26, 27 downward, and as known in the art, the amount of deflection (i.e., the amount of movement compressing the springs 25, 26, 27) for a given load on the platform 20 varies directly with the number of active coils or turns in the springs 25, 26, 27. For example, assume that a given load of say 50 plates or saucers placed on the platform 20 causes the 65 turns of each of the three springs 25, 26, 27 to deflect 25 inches. If the number of active turns of each of the springs is reduced from 65 to say 39 (i.e., 60% of the original), then the same 50 plates or saucers will cause the platform 20 and springs 25, 26, 27 to deflect only 15 inches (i.e., 60% of the original). Expressed in another way, the force required to produce a given deflection in a coil spring varies inversely with the number of active coils in the spring. As known to persons skilled in the art, other factors in a spring may be varied so as to change its deflection for a given force or load. However, these other factors are not as easily varied as the number of active coils.

The number of turns which are active in each of the three springs 25, 26, 27 may be varied by respective spring adjustment devices 30 shown positioned on the three elongated members 10, 11, 12. FIGURES 2 and 3 show views of the spring adjustment device 30 in its open or inoperative position for the member 10 and its spring 25. FIGURE 3 is taken along the section lines 3—3 in FIGURE 2. The spring adjustment device 30 includes an elongated central member 31 which, as will be explained, may be adjusted in length. The elongated central member 31 is secured in a fixed position by an attaching or securing member 32, which is pivotally fastened to the central member 31 by a suitable pin 33. The attaching member 32 may be a plate or similar element having a cylindrical opening therein of diameter slightly greater than the diameter of the elongated member 10. As known in the art, this opening permits the attaching member 32 to be slid over or on the elongated member 10. When the attaching member 32 is tilted relative to the elongated member 10, the edges of its opening grip or frictionally engage the outer surface of the elongated member 10 so that the attaching member 32 cannot move or slide. A coil turn engaging member 34 is fastened to the other end of the central member 31, and as shown, may simply be a portion that is bent in a hook-like fashion to engage one turn of the spring 25. In the embodiment shown in FIGURES 2 and 3, it is desired that the central member 31 be movable in order to compress the predetermined or preselected number of turns of the spring 25. This movement is achieved by providing a slide member 36 which slides in suitable grooves between two flanges 37. Movement of the slide member 36 is provided by a pin 38 which fits in an opening 39 in the slide member 36. The pin 38 is fastened to a rotatable disk 40 which can be rotated by a handle or knob 41. If, as viewed in FIGURE 3, the disk 40 is rotated in a counterclockwise direction, its pin 38 engages the surfaces of the opening 39 and moves or forces the slide member 36 in a downward direction. Rotation of the disk 40 in the other direction moves the pin 38 and slide member 36 upward. The downward position of the slide member 36 is shown in FIGURES 4 and 5. FIGURES 4 and 5 also show the coil turn engaging member 34 engaging a turn 25a of the spring 25. FIGURE 4 also shows how 12 turns (that is those between the turn 25a and the end of the spring 25 near the attaching member 32) are inactivated or deadened. With these 12 turns inactivated or deadened, the remainder of the active turns of the spring 25 will deflect less for a given load on the platform 20 of FIGURE 1. In a similar manner, the other spring adjustment devices 30 in FIGURE 1 for the springs 26 and 27 would likewise be operated to remove or inactivate 12 turns of the springs 26, 27. Thus, the platform 20 would deflect less for a given load with these 12 turns inactivated or removed.

It will thus be seen that our invention provides a new and improved spring adjustment device for varying the number of inactive turns (and hence varying the number of active turns) in a coil spring. The springs 25, 26, 27 may be designed so that when all of their turns are active, they deflect the desired amount for the lightest load expected on the platform 20. When some deflection for a greater load is desired, the number of active coils in each of the springs 25, 26, 27 may be reduced by inactivating a predetermined or experimentally determined number of turns of each of the springs. This inactivation of a number of turns can be easily achieved by the spring adjustment devices 30 shown in FIGURES 1 through 5.

FIGURE 6 shows a second embodiment of a spring adjustment device 60 in accordance with our invention. This spring adjustment device 60 comprises an elongated central member 61 having a suitable securing or attaching member 62 at one end. This securing member 62 may be similar to the securing member 32 shown in FIGURES 2 through 5. The spring adjustment device 60, however, includes a turn engaging member 63 which is different from the member 34. This turn engaging member 63 has a U-shaped or notched opening which surrounds a substantial portion, preferably at least 180 degrees, of the elongated member and a given turn of a spring. By rotating the spring shown in FIGURE 6, more or less turns may be threaded past the spring turn engaging member 63, thus leaving more or less active turns of the spring. The number of turns threaded into the confines between the spring turn engaging member 63 and the attaching member 62 determines the number of inactive turns on the spring. Either the spring or the adjustment device 60 may be rotated around the elongated cylindrical member to engage or encompass more or less turns. In either case, the number of active turns on the spring may be adjusted or varied.

It will thus be seen that our invention provides a new and improved coil spring adjustment device. This adjustment device is particularly useful and adaptable to dish elevators and similar equipment, because it is relatively compact and easy to adjust. The spring adjustment device may be readily operated or adjusted to change the number of spring turns and hence the spring deflection for a given load. The device thus maintains a dish platform, such as shown in FIGURE 1, at any desired or predetermined height for a wide range of loads. Persons skilled in the art will appreciate that modifications of our invention may be made. For example, the spring adjustment device may be attached to the elongated member at other fixed points by other means, such as a removable pin which passes through holes in the coil spring elongated support members. For the spring adjustment device shown in FIGURES 2 through 5, other means may be provided to move the slide member 36, although the rotatable handle or knob 41 with its pin 38 is preferred. The spring turn engaging member 63 of FIGURE 6 may surround more or less of a given spring turn, depending upon preference and use. Its U-shaped jaws may be resilient, so that they can be pulled out and a number of turns compressed downward or decompressed upward and then snapped back into position. Therefore, while our invention has been described with reference to particular embodiments, it is to be understood that modifications may be made without departing from the spirit of our invention or from the scope of the claims.

What we claim as new and desire to secure by Letters Patent of the United States is:

1. A device for varying the effective number of turns of a coil of resilient material wound on an elongated member comprising:
   (a) first means for attaching said device at a fixed location relative to said elongated member;
   (b) second means fastened to said first means for extending along a plurality of said turns of said coil;
   (c) and third means fastened to said second means for engaging one of said turns and for inactivating said plurality of turns.

2. An adjustment device for a helical spring positioned about a substantially cylindrical member comprising:
   (a) a central member having two ends joined by an adjustable portion;
   (b) means fastened to one end of said central member for attaching said central member to said cylindrical member in the vicinity of one end of said helical spring;

(c) and means fastened to the other end of said central member for engaging a portion of a selected turn of said helical spring and compressing the turns of said helical spring between said selected turn and said one end of said helical spring.

3. The adjustment device of claim 2 wherein said adjustable portion comprises a first piece having a movable pin and a second piece having an opening engaged by said pin so that said second piece is moved in response to movement of said pin to change the distance between said two ends of said central member.

4. The adjustment device of claim 3 wherein said attachment means comprise a plate having an opening therein which is larger than the diameter of said cylindrical member and which is formed by edges that frictionally engage said cylindrical member when said plate is tilted relative to said cylindrical member.

5. An adjustment device for a helical spring positioned about a substantially cylindrical member comprising:

(a) a central member having two ends joined by a central portion;
(b) means fastened to one end of said central member for attaching said central member to said cylindrical member in the vicinity of one end of said helical spring;
(c) and means fastened to the other end of said central member for threadedly engaging a portion of a selected turn of said helical spring and holding a number of turns of said helical spring between said threadedly engaged selected turn and said one end of said helical spring.

References Cited
UNITED STATES PATENTS

| | | | |
|---|---|---|---|
| 2,735,076 | 2/1956 | Hudson | 267—60 |
| 3,230,024 | 1/1966 | Gika | 267—1 |
| 3,327,655 | 1/1967 | MacKay | 312—71 |
| 3,331,337 | 7/1967 | MacKay | 312—71 |

ARTHUR L. LA POINT, *Primary Examiner.*

R. M. WOHLFARTH, *Assistant Examiner.*